US008824300B2

(12) United States Patent
Shatzkamer et al.

(10) Patent No.: US 8,824,300 B2
(45) Date of Patent: Sep. 2, 2014

(54) SYSTEM AND METHOD FOR USING FEEDBACK TO MANAGE CONGESTION IN A NETWORK ENVIRONMENT

(75) Inventors: Kevin D. Shatzkamer, Hingham, MA (US); Chris O'Rourke, Apex, NC (US); James C. Balquist, Overland Park, KS (US)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 13/016,669

(22) Filed: Jan. 28, 2011

(65) Prior Publication Data

US 2012/0195202 A1 Aug. 2, 2012

(51) Int. Cl.
*H04L 12/26* (2006.01)
*H04L 12/56* (2006.01)

(52) U.S. Cl.
CPC .................... *H04L 47/122* (2013.01)
USPC ........................................................ 370/236

(58) Field of Classification Search
USPC .................. 370/221, 225, 228, 229, 231, 230
See application file for complete search history.

(56) References Cited

U.S. PATENT DOCUMENTS

| | | | | |
|---|---|---|---|---|
| 6,813,245 | B1* | 11/2004 | Furuno | 370/236 |
| 2006/0013203 | A1* | 1/2006 | Benedyk et al. | 370/352 |
| 2006/0013204 | A1* | 1/2006 | Benedyk et al. | 370/352 |
| 2007/0230492 | A1* | 10/2007 | Ugai et al. | 370/412 |
| 2008/0049615 | A1* | 2/2008 | Bugenhagen | 370/230.1 |
| 2008/0275643 | A1* | 11/2008 | Yaqub et al. | 701/209 |
| 2010/0097934 | A1* | 4/2010 | Hendel et al. | 370/237 |
| 2011/0007656 | A1* | 1/2011 | He et al. | 370/252 |

OTHER PUBLICATIONS

Jeff Hewett and Lee Dryburgh, Signaling System No. 7 (SS7/C7) Protocol, Architecture, and Services.*
Cisco Systems, Inc., "Next-Generation SS7 Networks with the Cisco IP Transfer Point," White Paper, © 1992-2002 Cisco Systems, Inc. Press [retrieved and printed Jan. 28, 2011], 14 pages http://www.cisco.com/en/US/products/sw/wirelssw/ps1862/products_white_paper09186a00800febb2.shtml.
Cisco, Inc., "Signaling System No. 7 (SS7/C7)—Protocol, Architecture and Services (Full Book): Message Transfer Part 3 Timers," © Cisco, Inc., published by Cisco Press [retrieved and printed Jan. 28, 2011], 4 pages; http://www.ss7-training.net/sigtran-training/app07lev1sec2.html.
Cisco, Inc., "Part II. Protocols Found in the Traditional SS7/C7 Stack: Chapter 7. Message Transfer Part 3 (MTP3),", © Cisco, Inc., published by Cisco Press [retrieved and printed Jan. 28, 2011], 45 pages; http://www.ss7-training.net/index.html.

* cited by examiner

*Primary Examiner* — Jeffrey M Rutkowski
*Assistant Examiner* — Hardikkumar Patel (57) ABSTRACT

A method is provided in one example embodiment and includes receiving a first congestion message associated with traffic congestion in a signaling system seven (SS7) a network, the first congestion message being associated with a first timer. The method also includes receiving a second congestion message after the first timer has expired and before a second timer has expired. The method further includes communicating a portion of traffic, which was originally intended for a first destination, to a second destination in the network based on receiving the second congestion message. The method can further include recovering and returning to an initial state.

20 Claims, 4 Drawing Sheets

SYSTEM AND METHOD FOR USING FEEDBACK TO MANAGE CONGESTION IN A NETWORK ENVIRONMENT

TECHNICAL FIELD

This disclosure relates in general to the field of communications, and more particularly, to a system and a method for using feedback to manage congestion in a network environment.

BACKGROUND

Networking architectures have grown increasingly complex in communications environments, particularly mobile wireless environments. Data traffic has grown extensively in recent years, which has significantly increased the demands on radio resources. As the subscriber base of end users increases, efficient management of communication resources becomes even more critical. In some instances, network congestion may cause network equipment to be overwhelmed, provide suboptimal performance, or inhibit the delivery of messages. Hence, there is a significant challenge in managing network resources, particularly in the presence of network congestion.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a first congestion message associated with traffic congestion in a signaling system seven (SS7) a network, the first congestion message being associated with a first timer. The method also includes receiving a second congestion message after the first timer has expired and before a second timer has expired. The method further includes communicating a portion of traffic, which was originally intended for a first destination, to a second destination in the network based on receiving the second congestion message. The method can further include recovering and returning to an initial state in certain example scenarios.

In more specific implementations, the first congestion message and the second congestion message are received by a signal transfer point (STP). Additionally, the STP can be configured to execute a loadbalancing algorithm that sets particular server waits for offloading traffic to the second destination. Also, new traffic can be communicated back to the first destination after congestion levels have receded.

In detailed instances of the present disclosure, the first congestion message is a T29 timer and the second congestion message is a T30 message. The first congestion message and the second congestion message can each include backoff information associated with reducing incoming traffic flows. The first congestion message and the second congestion message can be communicated by a short message service center (SMSC). The portion of traffic can be associated with short message service (SMS) traffic.

Example Embodiments

Figure 1:
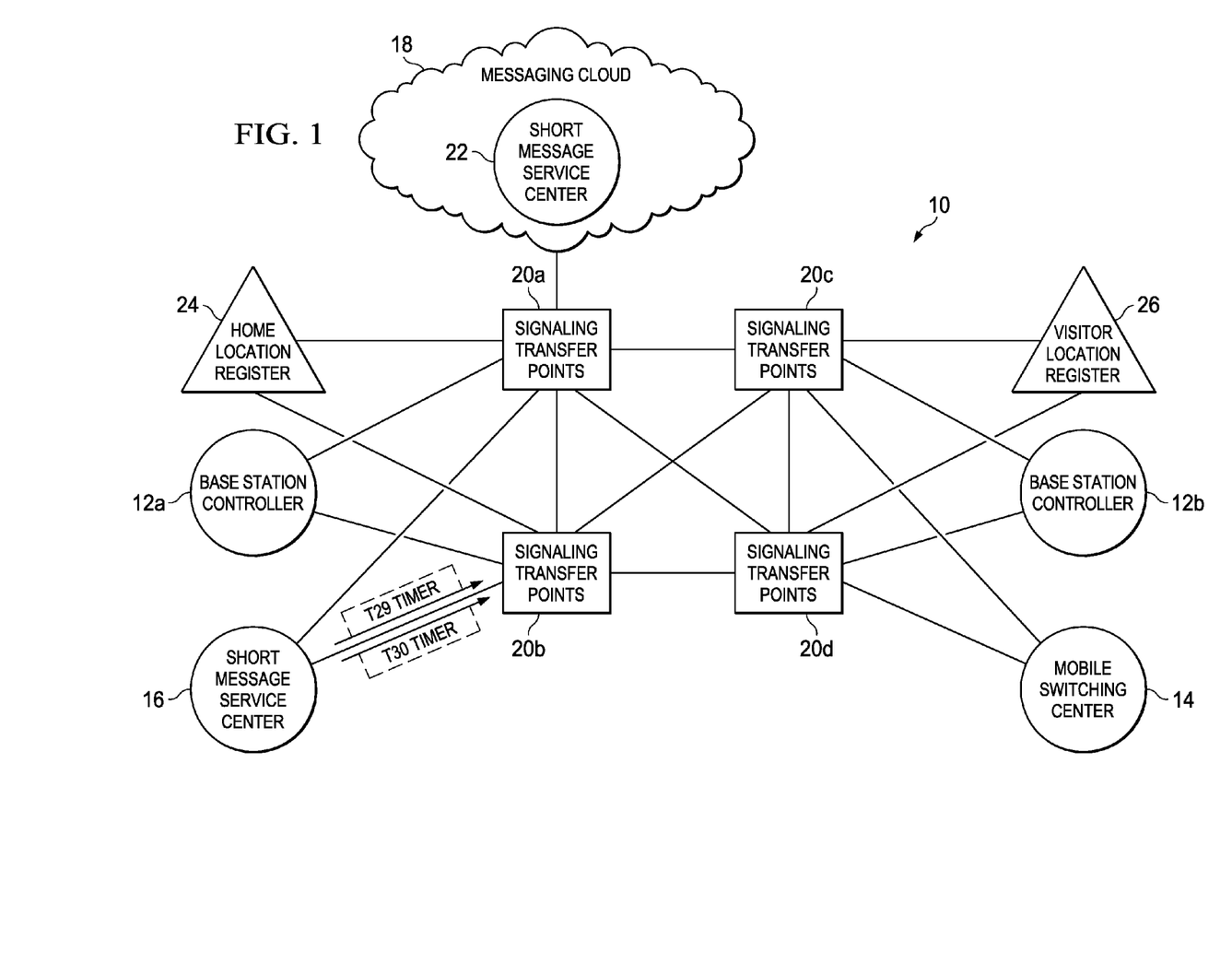
FIG. 1 is a simplified block diagram illustrating a communication system for managing congestion in a network environment according to one embodiment of the present disclosure.

Turning to FIG. 1, FIG. 1 is a simplified block diagram of a communication system 10 for using feedback to manage congestion in a network environment. This particular configuration may be tied to a signaling system seven (SS7) network; however, the teachings of the present disclosure may be equally applied to other types of networks. In this particular example, FIG. 1 includes multiple instances of base station controllers (BSCs) 12a-b, a mobile switching center (MSC) 14, multiple instances of short message service centers (SMSCs) 16, 22, a messaging cloud 18, multiple instances of signal transfer points (STPs) 20a-d, a home location register (HLR) 24, and a visitor location register (VLR) 26.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Before detailing the operations and the infrastructure of FIG. 1, certain contextual information is provided to offer an overview of some problems that may be encountered while managing congestion in a network environment. Such information is offered earnestly and for teaching purposes only and, therefore, should not be construed in any way to limit the broad applications for the present disclosure. SS7 is an out-of-band signaling method. This allows for SS7 to communicate information between network elements via independent signaling links. SS7 networks can quickly become overwhelmed with short message service (SMS) messaging, which use SS7 networks as the delivery transport.

There are several mechanisms to detect network congestion such as the Integrated services digital networks (ISDN) signaling user part (ISUP) protocol. The ISUP protocol supports congestion control mechanisms, and it can be used in both public switched telephone network (PSTN) and ISDN networks for call session establishment over message transfer part 3 (MTP-3). A standard voice call can be broken into three phases: setup, conversation, and release. ISUP provides call setup and release functions, as well as mid-call signaling capabilities for invoking supplementary services. Note that SS7 signaling can also be carried over Stream Control Transmission Protocol (SCTP), which can be ultimately carried over IP based on SIGTRAN standards.

The aforementioned congestion control procedures typically support a stepwise reduction of new call attempts through in-band signaling. To scale the SS7 network more effectively, SMS offload techniques have been created. These offload techniques involve de-encapsulating a message received on the A-interface in a mobile network from the BSC, issuing a response to the BSC, and encapsulating the message for transport across an IP packet network. This mechanism can offer modest congestion relief of the SS7 transport network.

Logistically, there are two timers that exist within the ISUP messaging, and the timers are used to determine when to backoff (i.e., throttle back traffic). If an STP identifies a congestion message, it starts those timers. If the STP identifies a second congestion message (before the T29 timer expires), then the second congestion message would be ignored. However, if the STP identifies a backoff timer between the expiration of the T29 timer and before the expiration of the T30 timer, then a window is present. A given STP can elect to backoff using a stepwise backoff algorithm (e.g., backing off one message per second) in order to drop the traffic load.

Unfortunately, there is some inefficiency in the way in which these timers operate in congestion scenarios in the SS7 network. No current mechanism, inclusive of ISUP signaling and SMS offload, resolve mobile operator services offload strategies in which a mobile operator is seeking to evolve away from offering service (e.g., by re-homing services including SMS messaging to a third-party cloud provider).

In accordance with one embodiment, communication system 10 can overcome the aforementioned shortcomings (and others) by providing a congestion feedback mechanism that integrates existing signaling technologies. Existing timers and existing congestion messaging can be leveraged to facilitate a suitable trigger for offloading traffic to a messaging cloud. In essence, the messaging cloud is a new destination (e.g., a new resource) for offloading congestion. In accordance with the teachings of communication system 10, rather than buffer overflow messages, the architecture can use feedback information (e.g., backoff information associated with a particular stepwise regression) to send those messages to messaging cloud 18. Hence, communication system 10 is configured to use existing ISUP timers and congestion signaling messages to allocate server weights within a loadbalancing group. In operation, the architecture is leveraging the ISUP signaling information to determine network node congestion, and subsequently providing a dynamic loadbalancing algorithm to redirect SMS messages into a hosted messaging cloud.

In contrast to existing systems, communication system 10 can use in-band ISUP signaling information to determine node congestion. Moreover, upon detection of such congestion, a hash algorithm (e.g., based on information received in ISUP signaling) can allocate cloud resources via a loadbalancing algorithm. The algorithm can be provisioned in STPs 20a-d in certain embodiments of the present disclosure. Once normal operations are detected, the architecture can implement a slow-start mechanism for methodically migrating traffic back to the local SMSC (for which the traffic was originally destined).

In operation of one example, a given device starts the T29 timer when a congestion message is received (but does not change forwarding). If another congestion message is received before the T29 expires, the device starts the T30 timer before sending any more traffic to the far side of the link. Hence, there are a few scenarios: 1) the T29 timer is not running; 2) the system receives a congestion message and starts the T29 timer; 3) the T29 timer can expire without another congestion message, and the system resumes normal operations; 4) a second congestion message is received (while the T29 timer is running), and the T30 timer is started. In certain implementations, while the T30 timer is running, the system stops sending traffic. When the T30 timer expires, the system can begin sending traffic again (e.g., slowly at first), restarting the T30 time each time the traffic is ratcheted higher. The present disclosure encompasses activities performed when these timers are running (e.g., specifically while the T30 timer is running). Rather than store outbound messages locally, communication system 10 is configured to route these messages to messaging cloud 18.

A number of important advantages can be achieved using the architecture of communication system 10. For example, such a system allows existing operators to continue to use their already-depreciated SMSC infrastructure to handle existing capacity. Additionally, such an arrangement can reduce operating expenditures by allowing the operator to burst excess messages to a third-party software as a service (SaaS)/messaging cloud. This effectively eliminates the need to support excess capacity in the existing SMSC. It should also be noted that communication system 10 offers better predictability for handling SMS capacity without forcing the over-engineering of SMSC resources. The architecture can also allow existing operators to slowly migrate to over-the-top (OTT)/SaaS/cloud-services for messaging. Additional details relating to the operational capabilities of communication system 10 are provided below. Before turning to those capabilities and additional features, the infrastructure of FIG. 1 is discussed.

Returning to FIG. 1, the lines connecting the elements of FIG. 1 can be thought of as SS7 links, which can be wired or wireless. Further, information can be carried via TDM or SCTP (IP-based) connections. In one particular example, each of STPs 20a-d is provisioned within a network element such as a router, gateway, etc. Routing of messages can be executed based on destination point codes, which can be representative of a called party number in certain example instances. FIG. 1 also includes several example timer messages (e.g., T29 and T30 timers) propagating from SMSC 16. Alternatively, any other suitable congestion message may be sent from SMSC 16 in order to indicate a certain capacity, or lack thereof for accommodating traffic.

Logistically, the out-of-band signaling network can include three key elements: signaling switching point (SSP) and the signaling control point (SCP), and an STP, which is the packet-switching element in the SS7 architecture. Although no messages originate from the STPs, they provide message screening, firewalling, and routing of messages between intelligent endpoints. Elements within SS7 communicate via either a time division multiplexing (TDM) or asynchronous transfer mode (ATM) network. Each element can be addressed via a unique Point Code (PC), similar to an IP address in the IP domain.

The standard length of an International Signaling Point Code (ISPC) is 14 bits. Aside from call setup/teardown and mobility/roaming, one of the most popular uses of the SS7 network for mobile operators is the transport of SMS messages. SMS uses the SS7 MAP for transmission between subscribers. An SMSC resides on the SS7 network for providing a store-and-forward function. When a message is received, the SMSC stores the message until it is able to successfully deliver the message. The SMSC relies on the VLR database to provide feature and user authentication, as well as subscriber location and routing information.

SMSC 16 enables users to receive certain types of messages (e.g., TEXT messages) on their mobile devices. It can be viewed as a mail server for SMS messaging. When SMSC 16 becomes overloaded, it can use the ISUP layer of the SS7 stack to signal the corresponding STPs to slow down the traffic destined for this SMSC 16. The STPs that received this message can buffer, store, and/or forward (or otherwise delay) SMS messages until SMSC 16 can begin receiving them again.

Messaging cloud 18 can simply be representative of a third-party architecture associated with SMSC capabilities. Messaging cloud 18 can advertise certain capacities to interested network elements, or network operators. In certain example implementations, messaging cloud 18 is configured to store and forward the incoming offloaded messages. In other instances, messaging cloud 18 is capable of completely handling the incoming offloaded messages, without further involving the service provider that originally the offloaded messages. Note that these activities of messaging cloud 18 are in contrast to existing operations in which the same SMS messages would not be sent, or simply would not be delivered to their intended destination.

Note that FIG. 1 highlights two important design considerations in the deployment model for STPs and SSPs. For example, FIG. 1 illustrates mated pairs, where each signaling node in a mated pair performs the same functions. This provides platform resiliency to the SS7 network. FIG. 1 also illustrates quads, where the STPs are interconnected with four sets of links. This provides link and path resiliency to the SS7 network. For the individual SS7 links, these represent the physical transmission that connects signaling nodes in the SS7 network. For example, these links can be serial (56 kbps or 64 kbps) links, DS0 channels, or SCTP associations.

In operation, the architecture of communication system 10 uses ISUP-based signaling to determine network congestion and implements that information into a loadbalancing algorithm. For instance, during initial normal un-contentious network operations, traffic can be sent to a local SMSC. Multiple SMSCs could be configured in an SS7 loadbalancing group: including both local and cloud SMSC. Initial cloud SMSC weights could be zero, which reflects that traffic remains within the operator domain. This initial setting can avoid costly fees from SaaS cloud providers, who potentially use per-event charging models. The weighting could subsequently increase, as new traffic propagates in the network and builds into a full congestion scenario.

Each of STPs 20a-d are configured to track the T29 and T30 timers in ISUP signaling messages (e.g., and any received C1 primitives that may indicate congestion). These timers/messages are intended to be used for throttling traffic on the SS7 network. Information in these messages may be used for stepwise loadbalancing (or offloading) of SMS messages from a congested SMSC to available resources. This is performed in lieu of using these timers as part of a stepwise congestion avoidance and/or throttling mechanism.

Semantically, the architecture of communication system 10 can dynamically increase server weights within a loadbalancing group based on ISUP C1 messages received during the T29 and T30 intervals. Rather than using these timers as true backoff messages, the configuration of communication system 10 seeks to use these as stepwise increases in weights for loadbalancing algorithms involving messaging cloud 18. This would allow for the most efficient delivery of all SMS messages, even during a state of congestion in the local operator domain, by automatically assigning available resources in the SaaS/cloud domain for message processing.

Note that any type of client or customer wishing to initiate a flow can leverage the capabilities of communication system 10. The terms 'user equipment', 'mobile node', 'end user', and 'subscriber' are inclusive of devices used to initiate a communication in the network of communication system 10 and include items such as a computer, a personal digital assistant (PDA), a laptop or electronic notebook, a cellular telephone, an i-Phone, i-Pad, a Google Droid phone, an IP phone, or any other device, component, element, or object capable of initiating voice, audio, video, media, or data exchanges within communication system 10. This may also be inclusive of a suitable interface to the human user such as a microphone, a display, a keyboard, or other terminal equipment.

This may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Figure 2:
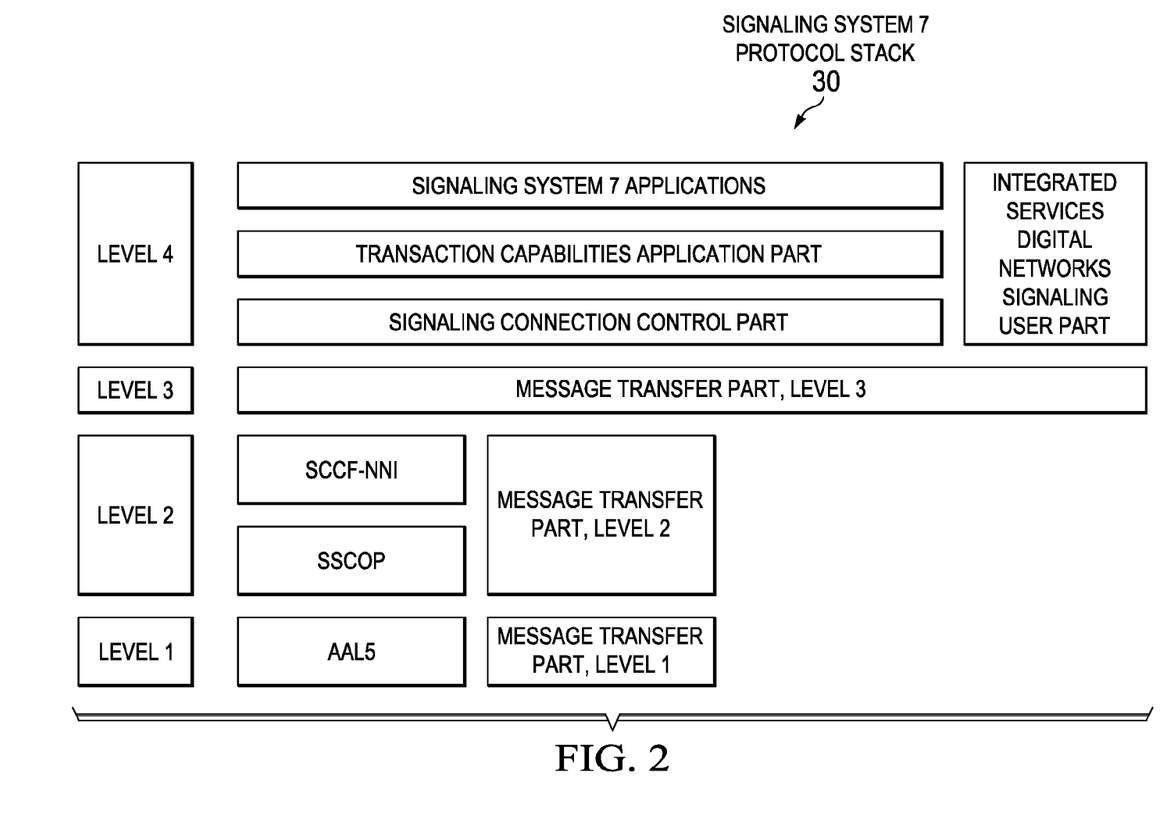
FIG. 2 is a simplified block diagram illustrating an example protocol stack associated with the communication system.

Turning to FIG. 2, FIG. 2 is a simplified block diagram illustrating an SS7 protocol stack 30. The SS7 protocol is packet-switched, and it can map closely to the OSI model. SS7 protocol stack 30 defines the following functions: Level 1: The Physical layer; Level 2: The Data Link layer; Level 3: The Network layer; and Level 4: Higher-layer protocols (including User and Application functions). Together, Level 1 through Level 3 are referred to as the Message Transfer Part (MTP), which consists of three levels that map closely to the Physical, Data Link, and Network layer of the OSI model. These layers provide the basic functions of network element connectivity and message exchange. The signaling nodes in the SS7 network implement the MTP.

MTP Level 1 (MTP-1) can provide the physical layer attributes of the signaling links such as electrical characteristics. The physical interfaces defined for SS7 can include DS0, E1, DS1, DS0A, and V.35. MTP Level 2 (MTP-2) provides the procedures for transmitting messages reliably across the signaling link. Functions such as flow control, message sequence validation, and error checking are performed at this layer. MTP Level 3 (MTP-3) provides the functions for network transport. These functions include addressing (Point Codes), routing, convergence (re-routing in the event of a failure), and congestion control.

The Signaling Connection Control Part (SCCP) part of Level 4 provides specialized routing functions. SCCP is typically implemented in SS7 signaling nodes. Although the MTP defines how to route traffic to a particular signaling endpoint via PCs, SCCP provides more granular capabilities to route traffic to a particular application. This allows an endpoint to use the correct SS7 application for a particular message. This function is similar to the Transport layer of the OSI model, which provides protocol/port information.

SCCP also provides Global Title Translation (GTT). GTT is a mechanism of summarizing PCs across a network. Like route summarization in routing protocols, GTT allows signaling nodes to learn only a portion of the SS7 network, and route messages to other signaling nodes that have more detailed information on the destination PC. Each STP maintains a database to determine where the message should be routed. This database is similar to a routing table maintained by a network router. GTT is a key capability for mobile networks. For instance, at initial network entry, GTT is used based on IMSI information to find the subscriber's HLR. GTT is also used to find a MSC/VLR based on a registered number.

Application Parts of the SS7 protocol stack are transported using SCCP. Application Parts map closely to Layer 7 (the Application layer) of the OSI model, and enable enhanced or advanced functionality (such as IN services) over the SS7 network. Application Parts are typically implemented in signaling endpoints. STPs do not need to understand the Application Part to transport the message to the destination PC. Common examples of Application Parts include the Transaction Capabilities Application Part (TCAP), which is used for database communication and to establish a transaction between two nodes. In the mobile network, these databases include the HLR, the VLR, and the Mobile Number Portability (MNP) database.

Figure 3:
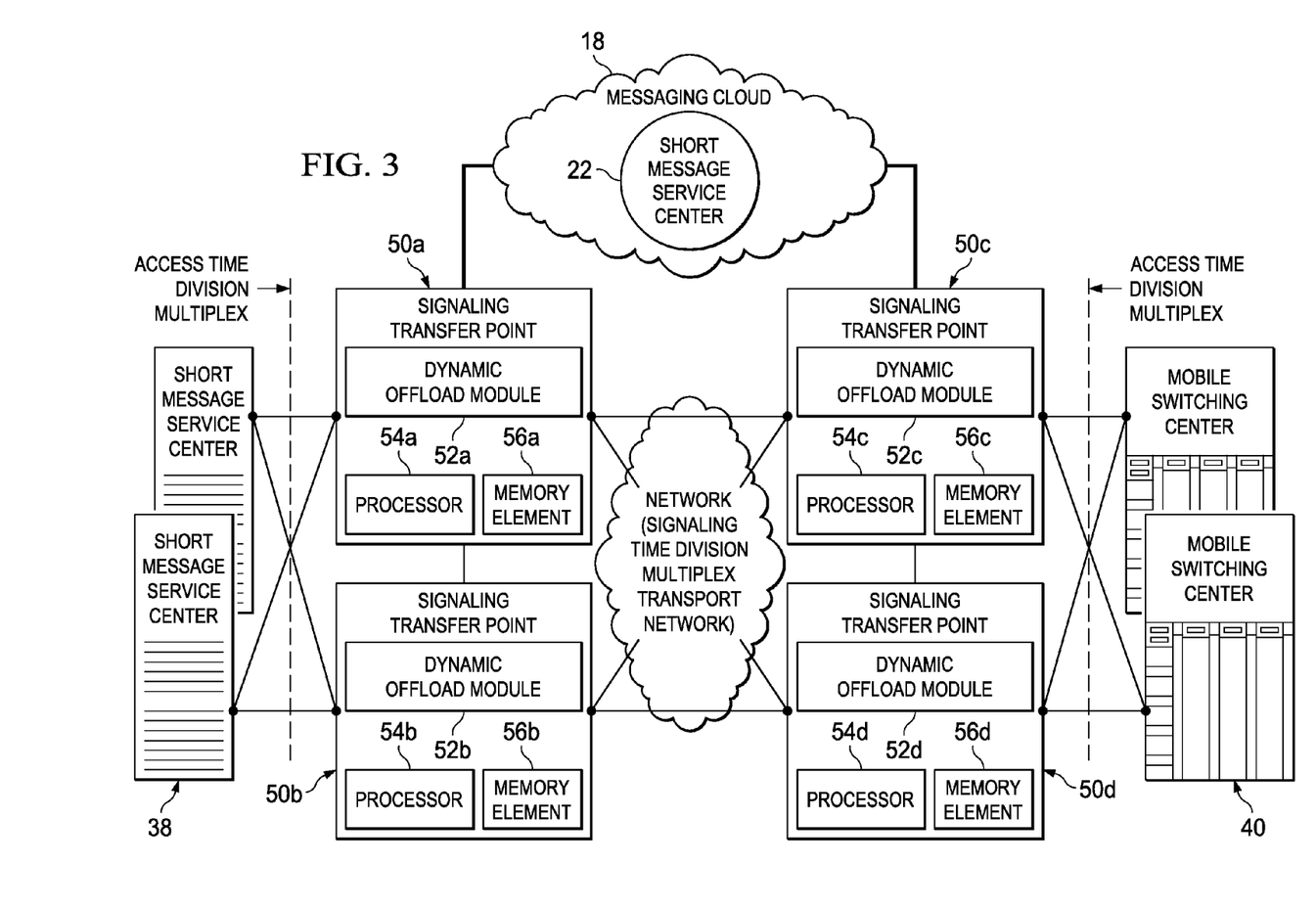
FIG. 3 is a simplified block diagram illustrating additional details associated with one potential embodiment of the communication system.

FIG. 3 is a simplified block diagram illustrating one potential arrangement associated with communication system 10. In this particular example, there are multiple SMSCs 38 and multiple MSCs (e.g., softswitches) 40. Additionally, FIG. 3 includes a plurality of STPs 50*a-d*: each of which include a respective dynamic offload module 52*a-d*, a respective processor 54*a-d*, and a respective memory element 56*a-d*. In operation, each dynamic offload module 52*a-d* is configured to identify cases of congestion and, further, to identify when congestion has subsided. For example, existing SS7 infrastructure may be faster and perform better such that in an ideal scenario, traffic would be routed through that infrastructure. In order to increase capacity, dynamic offload modules 52*a-d* are configured to leverage messaging cloud 18 under appropriate congestion circumstances.

Hence, appropriate software and/or hardware is provisioned in STPs 20*a-d* in order to facilitate the dynamic offload activities discussed herein. A single instance of the STP may be provisioned in a given network scenario, or multiple instances of this element may be provisioned based on the particular use case. Alternatively, such a mechanism can be provisioned in any of the other elements of FIG. 1. Such provisioning may be based on particular operator constraints, particular networking environments, or specific protocol parameters. Note that in certain examples, certain databases can be consolidated with memory elements (or vice versa), or the storage can overlap/exist in any other suitable manner.

In one example implementation, SMSCs 16, 22, BSCs 12*a-b*, MSC 14, and STPs 20*a-d* are network elements, which are meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In regards to the internal structure associated with communication system 10, each of SMSCs 16, 22, BSCs 12*a-b*, MSC 14, and STPs 20*a-d* can include memory elements for storing information to be used in achieving the dynamic offload operations, as outlined herein. Additionally, each of these devices may include a processor that can execute software or an algorithm to perform the dynamic offload activities discussed herein. These devices may further keep information in any suitable memory element [(e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element.' The information being tracked or sent by SMSCs 16, 22, BSCs 12*a-b*, MSC 14, and/or STPs 20*a-d* could be provided in any database, queue, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements and user equipment (e.g., mobile nodes) can also include suitable interfaces for receiving, transmitting, and/or otherwise communicating data or information in a network environment.

In one example implementation, each of the STPs 20*a-d* include software (e.g., as part of dynamic offload modules 52*a-d*, etc.) to achieve, or to foster, the dynamic offload operations, as outlined herein. In other embodiments, this dynamic offload feature may be provided externally to these elements, or included in some other network device to achieve this intended functionality. Alternatively, these elements can include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, the dynamic offload functions outlined herein may be implemented by logic encoded in one or more tangible media (e.g., embedded logic provided in an ASIC, in DSP instructions, software [potentially inclusive of object code and source code] to be executed by a processor, or other similar machine, etc.). In some of these instances, memory elements [as shown in FIG. 3] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 3] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 4:
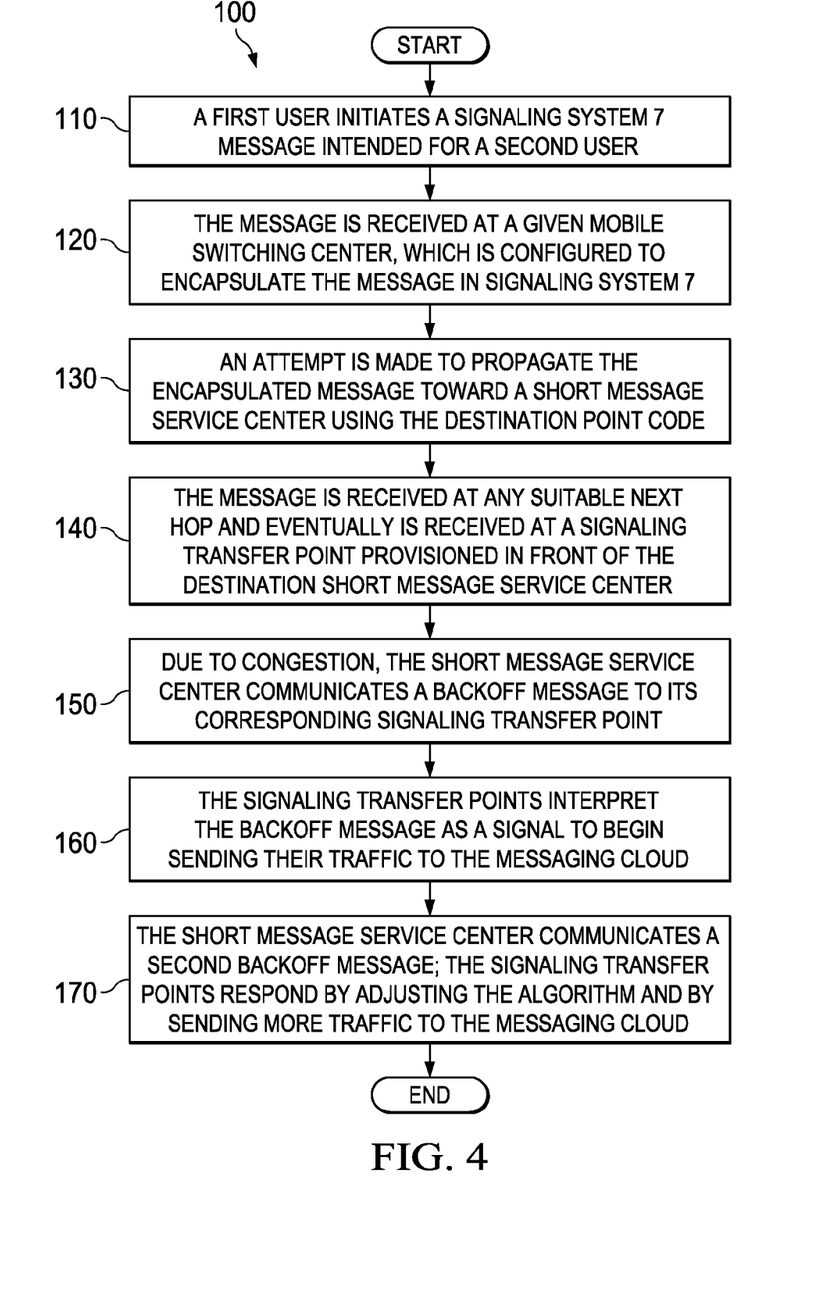
FIG. 4 is a simplified block diagram illustrating one possible example implementation of the communication system.

FIG. 4 is a simplified flowchart 100 illustrating an example use case associated with communication system 10. In 110, a first user initiates an SS7 message (e.g., a TEXT message) intended for a second user, where both users are using iPhones in this example. At 120, that message is received at a given MSC, which is configured to encapsulate the message in SS7. In this case, the SS7 network can be thought of as the routing domain, whereas the MSC and the SMSC are the endpoints. At 130, an attempt is made to propagate the encapsulated message toward an SMSC using the destination point code. At 140, the message is received at any suitable next hop (e.g., a signaling gateway, an STP, etc.). Eventually, the message is received at an STP (provisioned in front of the destination SMSC), where this particular STP handles the delivery of the message.

Due to congestion, the SMSC communicates a backoff message to its corresponding STP at 150. In this particular example, the SMSC is using MTP to communicate the backoff message, which indicates that the SMSC cannot receive traffic as fast as the STP is sending it. In certain instances, that backoff algorithm can be pervasive in the network such that all interested devices become aware that this particular SMSC is congested.

At 160, the architecture of the present disclosure solves deficiencies in existing timer activities by signaling to the infrastructure (e.g., the STPs) to begin sending their traffic to messaging cloud 18. This would obviate the need to buffer and to store traffic within the entire network. For example, if the congested SMSC sent a backoff message indicating to stop sending one message per second, then throughout would be increased (or at least maintained) by one message per second via directing the messages to the new destination (e.g., messaging cloud 18). Additionally, if the SMSC communicates a second backoff message, then the network infrastructure could respond by adjusting the algorithm and by sending more traffic to messaging cloud 18. This is illustrated by 170. At least in one general sense, a certain loadbalancing is achieved in this fashion by throttling the rate of offload to the messaging cloud.

Hence, by using timers and backoff algorithms in SS7 networks, the system can dynamically change the weights of the algorithm. Note that other implementations can use various types of loadbalancing mechanisms (round-robin, flow start, etc.) in which there are multiple SMSCs (i.e., multiple offload pathways) that can be used in the congestion scenarios discussed herein.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where an offload module (e.g., dynamic offload modules 52*a*-*d*) is provided within the network elements, these modules can be provided externally, or consolidated and/or combined in any suitable fashion. In certain instances, the dynamic offload module may be provided in a single proprietary element, device, unit, etc. Additionally, the teachings of the present disclosure are not simply applicable to SS7 networks. Instead, communication system 10 can readily be used by any protocol in which timers are used (e.g., TCP retransmission timers). It is along similar lines, the teachings of the present disclosure are applicable to long-term evolution (LTE) configurations, WiMAX, code division multiple access (CDMA), Femto configurations, WiFi, or any other suitable architecture in which similar congestion scenarios could be present.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
  receiving a first congestion message associated with traffic congestion in a signaling network;
  starting a first timer in response to receiving the first congestion message, wherein the first timer is configured to determine when to throttle back network traffic in response to network congestion;
  receiving a second congestion message;
  determining whether the second congestion message was received before the first timer expired or after the first timer expired;
  when the second congestion message was received after the first timer expired:
    restarting the first timer when the second congestion message was received; and
    storing the network traffic in a local database while the first timer is running; and
  when the second congestion message was received before the first timer expired:
    starting a second timer when the second congestion message was received;
    sending a portion of network traffic, which was originally intended for a first destination, to a second destination in the network until the second timer expires;
    restarting the second timer; and
    throttling back network traffic to the first destination for a duration of time resulting from the restarting of the second timer, wherein the network traffic is throttled back using a step-wise backoff algorithm to reduce the network traffic at a rate of one message per second.

2. The method of claim 1, wherein:
  receiving the first congestion message and receiving the second congestion message comprises receiving the first congestion message and the second congestion message by a signal transfer point (STP).

3. The method of claim 2, wherein the STP executes a loadbalancing algorithm that establishes particular server waiting times for offloading traffic to the second destination.

4. The method of claim 1, wherein:
  receiving the first congestion message comprises receiving the first congestion message that includes first backoff information associated with reducing incoming traffic flows;
  starting the first timer comprises starting a T29 timer;

receiving the second congestion message comprises receiving the second congestion message that includes second backoff information associated with reducing incoming traffic flows; and starting the second timer comprises starting a T30 timer.

5. The method of claim 1, further comprising sending new traffic back to the first destination after congestion levels have receded.

6. The method of claim 1, wherein receiving the first congestion message and the second congestion message comprises receiving the first congestion message and the second congestion message by a short message service center (SMSC).

7. The method of claim 1, wherein sending comprises sending the portion of traffic associated with short message service (SMS) traffic.

8. Logic encoded in non-transitory media that includes instructions for execution and when executed by a processor operable to:
 receive a first congestion message associated with traffic congestion in a signaling network;
 start a first timer in response to receiving the first congestion message, wherein the first timer is configured to determine when to throttle back network traffic in response to network congestion;
 receive a second congestion message;
 determine whether the second congestion message was received before the first timer expired or after the first timer expired;
 when the second congestion message was received after the first timer expired:
  restart the first timer when the second congestion message was received; and
  store the network traffic in a local database while the first timer is running; and
 when the second congestion message was received before the first timer expired:
  start a second timer when the second congestion message was received;
  send a portion of network traffic, which was originally intended for a first destination, to a second destination in the network until the second timer expires;
  restart the second timer; and
  throttle back network traffic to the first destination for a duration of time resulting from restarting of the second timer, wherein the network traffic is throttled back using a step-wise backoff algorithm to reduce the network traffic at a rate of one message per second.

9. The logic of claim 8, wherein the instructions operable to receive the first congestion message and the second congestion message comprise instructions operable to receive the first congestion message and the second congestion message by a signal transfer point (STP).

10. The logic of claim 9, wherein the STP executes a loadbalancing algorithm that establishes particular server waiting times for offloading traffic to the second destination.

11. The logic of claim 8, wherein:
 the instructions operable to receive the first congestion message comprise instructions operable to receive the first congestion message that includes first backoff information associated with reducing incoming traffic flows;
 the instructions operable to start the first timer comprise instructions operable to start a T29 timer;
 the instructions operable to receive the second congestion message comprise instructions operable to receive the second congestion message that includes second backoff information associated with reducing incoming traffic flows; and
 the instructions operable to start the second timer comprise instructions operable to start a T30 timer.

12. The logic of claim 8, further comprising instructions operable to send new traffic back to the first destination after congestion levels have receded.

13. The logic of claim 8, wherein the instructions operable to receive the first congestion message and the second congestion message comprise instructions operable to receive the first congestion message and the second congestion message by a short message service center (SMSC).

14. The logic of claim 8, wherein the instructions operable to send comprise instructions operable to send the portion of traffic associated with short message service (SMS) traffic.

15. An apparatus, comprising:
 a memory element configured to store electronic code;
 an offload module; and
 a processor configured to interface with the memory element and the offload module and configured to:
  receive a first congestion message associated with traffic congestion in a signaling network;
  start a first timer in response to receiving the first congestion message, wherein the first timer is configured to determine when to throttle back network traffic in response to network congestion;
  receive a second congestion message;
  determine whether the second congestion message was received before the first timer expired or after the first timer expired;
  when the second congestion message was received after the first timer expired:
   restart the first timer when the second congestion message was received; and
   store the network traffic in a local database while the first timer is running; and
  when the second congestion message was received before the first timer expired:
   start a second timer when the second congestion message was received;
   send a portion of network traffic, which was originally intended for a first destination, to a second destination in the network until the second timer expires;
   restart the second timer; and
   throttle back network traffic to the first destination for a duration of time resulting from restarting of the second timer, wherein the network traffic is throttled back using a step-wise backoff algorithm to reduce the network traffic at a rate of one message per second.

16. The apparatus of claim 15, wherein the processor is further configured to receive the first congestion message and the second congestion message by a signal transfer point (STP).

17. The apparatus of claim 16, wherein the processor is further configured to establish particular server waiting times for offloading traffic to the second destination, and the STP executes a loadbalancing algorithm that sets particular server waits for offloading traffic to the second destination.

18. The apparatus of claim 15, wherein the processor is further configured to:
 receive the first congestion message that includes first backoff information associated with reducing incoming traffic flows;
 start a T29 timer;

receive the second congestion message that includes second backoff information associated with reducing incoming traffic flows; and start a T30 timer.

19. The apparatus of claim 15, wherein the processor is further configured to send new traffic back to the first destination after congestion levels have receded.

20. The apparatus of claim 15, wherein the processor is further configured to receive the first congestion message and the second congestion message by a short message service center (SMSC).

* * * * *